(12) United States Patent
Kula

(10) Patent No.: US 11,975,518 B2
(45) Date of Patent: May 7, 2024

(54) PAPERBOARD PANEL AND METHOD OF MAKING SAME

(71) Applicant: Star Board Materials, LLC, Elk Grove Village, IL (US)

(72) Inventor: Gregory R. Kula, The Villages, FL (US)

(73) Assignee: STAR BOARD MATERIALS, LLC, Elk Grove Village, IL (US)

( * ) Notice: Subject to any disclaimer, the term of this patent is extended or adjusted under 35 U.S.C. 154(b) by 0 days.

(21) Appl. No.: 17/885,648

(22) Filed: Aug. 11, 2022

(65) Prior Publication Data

US 2023/0057213 A1 Feb. 23, 2023

Related U.S. Application Data

(62) Division of application No. 16/690,780, filed on Nov. 21, 2019, now Pat. No. 11,440,284.

(Continued)

(51) Int. Cl.
*B32B 3/26* (2006.01)
*B31F 5/02* (2006.01)
(Continued)

(52) U.S. Cl.
CPC .............. *B32B 3/266* (2013.01); *B31F 5/027* (2013.01); *B32B 3/28* (2013.01); *B32B 7/12* (2013.01); *B32B 7/14* (2013.01); *B32B 29/005* (2013.01); *B32B 37/0076* (2013.01); *B32B 37/12* (2013.01); *B32B 38/0004* (2013.01);
(Continued)

(58) Field of Classification Search
CPC .. B32B 3/28; B32B 3/266; B32B 7/12; B32B 7/14; B32B 29/005; B32B 37/12; B32B 37/0076; B32B 38/0004; B32B 2250/02; B32B 2250/26; B32B 2317/12;
(Continued)

(56) References Cited

U.S. PATENT DOCUMENTS 3,846,218 A 11/1974 Wootten
5,538,775 A 7/1996 Kawakami et al.
(Continued)

FOREIGN PATENT DOCUMENTS

CN 203603357 U 5/2014
WO WO 03/086746 A1 * 11/2003 ............. B31D 3/002
WO WO 2015075579 5/2015

OTHER PUBLICATIONS

DE9015521 U1 to Greil; English machine translation; Mar. 1991; 6 pages. (Year: 1991).*

(Continued)

*Primary Examiner* — Linda L Gray
(74) *Attorney, Agent, or Firm* — Douglas B Teaney; CARDINAL LAW GROUP

(57) ABSTRACT

A method for fabricating a sheet structure from paper and/or paperboard material, which provides a thickness dimension ordinarily associated with corrugated paperboard material. The sheet structure is constructed from a first planar linerboard sheet and a second non-planar linerboard sheet, wherein a plurality of projections are cut and folded from the second linerboard sheet and are adhesively coupled to the first linerboard sheet, such that portions of the projections define a standoff between the first and second linerboard sheets.

6 Claims, 5 Drawing Sheets

Related U.S. Application Data

(60) Provisional application No. 62/770,323, filed on Nov. 21, 2018.

(51) Int. Cl.
*B32B 3/28* (2006.01)
*B32B 7/12* (2006.01)
*B32B 7/14* (2006.01)
*B32B 29/00* (2006.01)
*B32B 37/00* (2006.01)
*B32B 37/12* (2006.01)
*B32B 38/00* (2006.01)

(52) U.S. Cl.
CPC ....... *B32B 2250/02* (2013.01); *B32B 2250/26* (2013.01); *B32B 2317/12* (2013.01); *B32B 2439/62* (2013.01)

(58) Field of Classification Search
CPC .... B32B 2439/62; B31F 5/027; B31F 1/0006; B31F 1/0045; Y10T 156/1051
See application file for complete search history.

(56) References Cited

U.S. PATENT DOCUMENTS

| | | |
|---|---|---|
| 5,958,551 A | 9/1999 | Garcia-Ochoa |
| 6,939,599 B2 | 9/2005 | Clark |
| 8,573,135 B2 | 11/2013 | Le Monnier |
| 8,585,951 B2 | 11/2013 | Muhs et al. |
| D748,932 S | 2/2016 | Puricelli |
| 9,403,338 B2 | 8/2016 | Tuczek |
| 9,649,822 B2 | 5/2017 | Hugues et al. |
| 2002/0014051 A1 | 2/2002 | Fraval et al. |
| 2011/0039045 A1 | 2/2011 | Russell |
| 2011/0114712 A1 | 5/2011 | Malo et al. |
| 2013/0264856 A1 | 10/2013 | Noble et al. |
| 2013/0292051 A1 | 11/2013 | Duron |
| 2014/0284893 A1 | 9/2014 | Faber et al. |

OTHER PUBLICATIONS

English machine translation of CN 203603357 U; May 21, 2014; Lin, Li; 3 pages. (Year: 2014).*

* cited by examiner

PAPERBOARD PANEL AND METHOD OF MAKING SAME

CROSS REFERENCE TO RELATED APPLICATIONS

This application is a divisional application of U.S. patent application Ser. No. 16/690,780, filed 21 Nov. 2019, which is incorporated herein by reference in its entirety.

TECHNICAL FIELD

This invention relates generally to panels fabricated from paper, paperboard and/or corrugated paperboard, and methods for making same. More particularly, the invention relates to panels fabricated from paperboard which have a configuration different from conventional three-layer corrugated paperboard panels, such as are used for constructing boxes, containers, displays and related shipping materials.

BACKGROUND OF THE INVENTION

Corrugated paperboard is a ubiquitous material in the fields of packaging and display devices, chosen for its light weight, strength, relatively low cost compared to other materials, and recyclability.

Because corrugated paperboard products may be produced and sold in quantities numbering in the millions, hundreds of millions or even billions, it has become recognized that reduction in the amount of material used, even a savings of just a fraction of a percent of the material required in a known paperboard product, can result in a substantial cost savings.

Corrugated paperboard panel material, for example, is fabricated from at least two layers of flat linerboard material, each layer being fabricated from one or more plies of raw paper sheet material. Between any two adjacent layers of flat linerboard material is provided at least one layer of corrugated medium.

It would be desirable to provide a paperboard panel product that provides performance sufficient to requirements in terms of strength, durability and versatility, while providing a substantial savings in terms of material cost.

SUMMARY OF THE INVENTION

The present invention comprises, in part, a paperboard panel. The paperboard panel comprises a first linerboard; a second linerboard; and at least one spacer structure extending between the first linerboard and the second linerboard. The at least one spacer structure further comprises at least one flap member extending monolithically from one of the first and second linerboards. A tip of the at least one flap member is coupled to an inwardly-facing surface of the other of the first and second linerboards.

The present invention further comprises, in part, a method of fabricating a paperboard panel. The method comprises the steps of:

fabricating a first linerboard;
fabricating a second linerboard;
forming a spacer structure, the spacer structure comprising at least one flap member extending monolithically from one of the first and second linerboards.

The step of forming a spacer structure further comprises the steps of cutting at least one flap member into one of the first and second linerboards, folding the at least one flap member in a first direction, into an orientation defining an angle with respect to the one of the first and second linerboards, folding a tip portion of the at least one flap member in a second direction, to define a body portion of the at least one flap member, extending between the tip portion and the one of the first and second linerboards, the tip portion being folded into an orientation defining an angle with respect to the body portion;

coupling a surface of the tip portion of the at least one flap member to an inwardly-facing surface of the second linerboard.

The aforementioned and other features and advantages of the invention will become further apparent from the following detailed description of the presently preferred embodiments, read in conjunction with the accompanying drawings, which are not to scale. The detailed description and drawings are merely illustrative of the invention, rather than limiting, the scope of the invention being defined by the appended claims and equivalents thereof.

DETAILED DESCRIPTION

Figure 1:
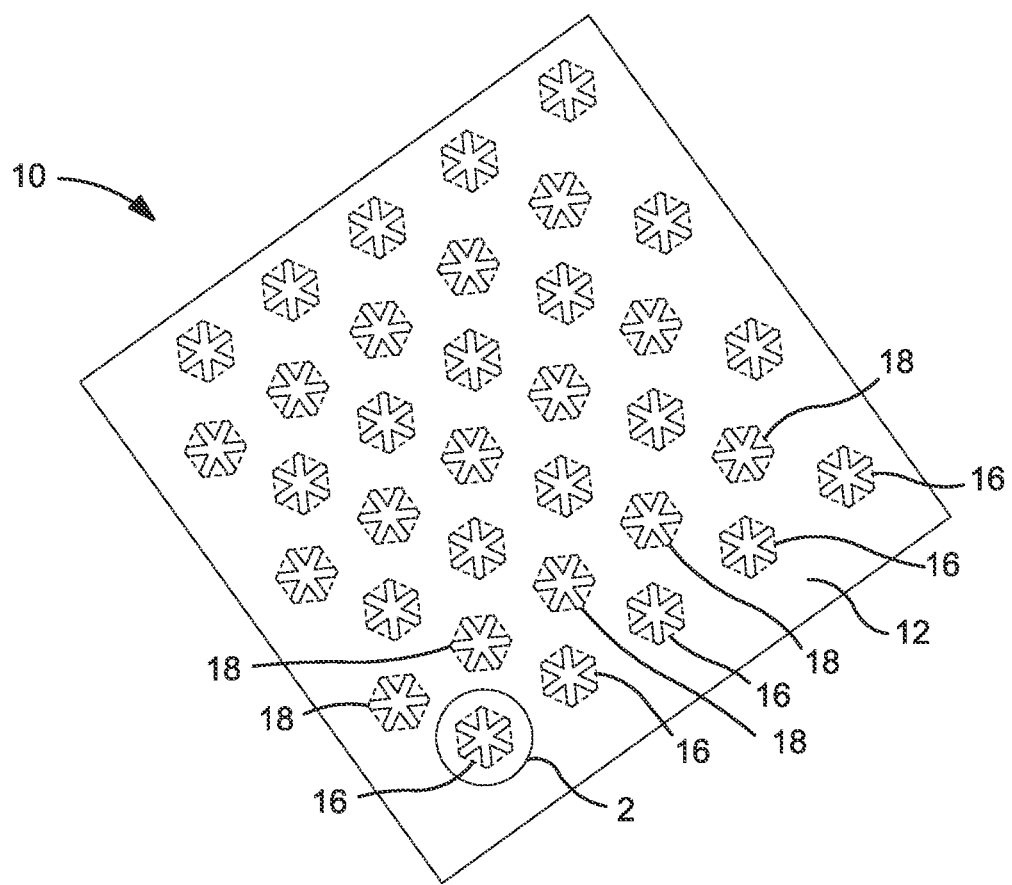
FIG. 1 is a first plan view of the paperboard panel according to an embodiment of the invention.

While this invention is susceptible of embodiment in many different forms, there is shown in the drawings, and described in detail herein, a specific embodiment, with the understanding that the present disclosure is to be considered as an exemplification of the principles of the invention, and is not intended to limit the invention to the embodiment illustrated.

Figure 2:
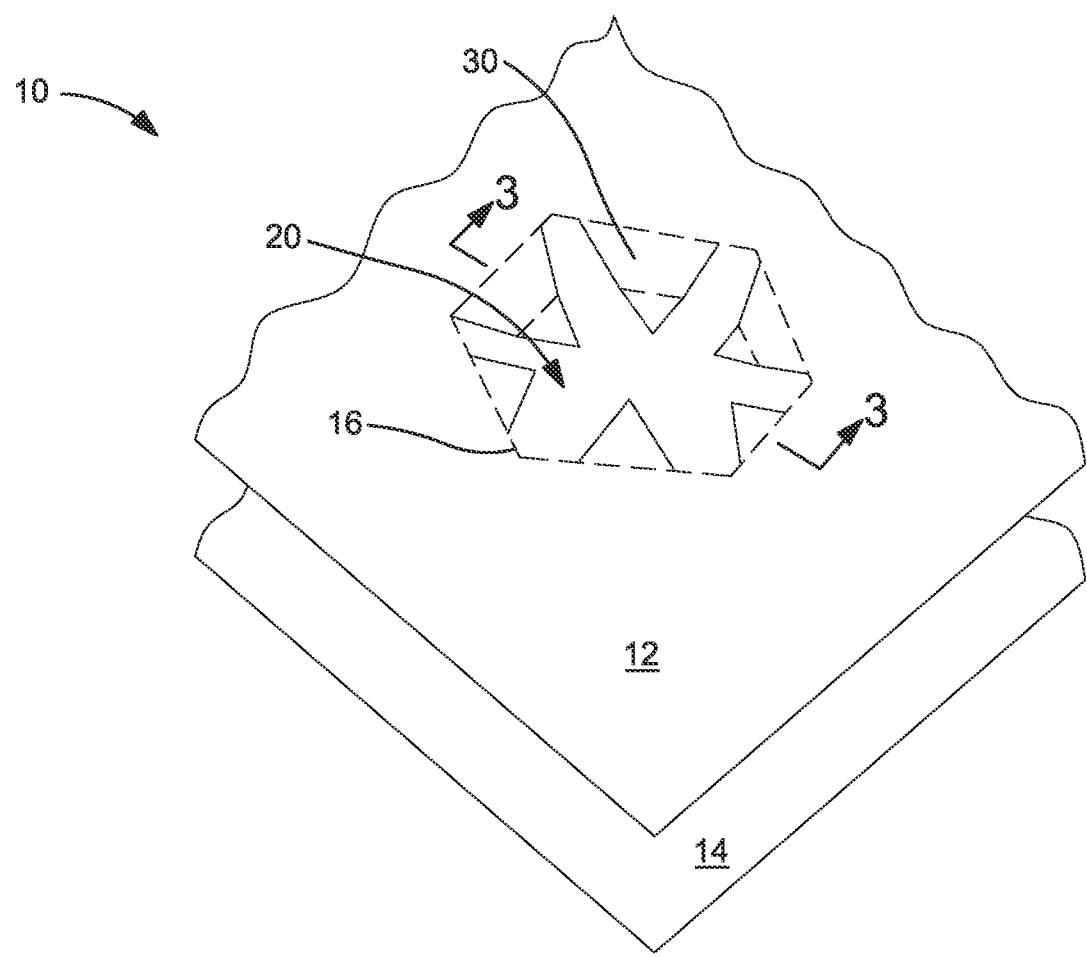
FIG. 2 is an enlarged perspective view of the circled area labeled "2" as shown in FIG. 1.

FIG. 1 is a first plan view of a paperboard panel 10 according to an embodiment of the invention. FIG. 2 is an enlarged perspective view of region 2 (FIG. 1) of panel 10, and FIG. 3 is a side elevation, in section of panel 10, taken along line 3-3 of FIG. 2.

Panel 10 comprises first linerboard 12 and second linerboard 14, held apart in a stable relationship by alternating rows of spacer structures 16 and 18. In the embodiment of FIG. 1-3, two different spacer structures, 16 and 18, are employed; however, in alternative embodiments of the invention, a greater or lesser number of types of spacer structures may be present. It is further to be understood that the designations "first" and "second" are arbitrarily selected and employed for convenience, and are not intended to imply any form of limitation to the structure, method of manufacture, or use of the invention described herein, such as by way of any designation of orientation.

Figure 3:
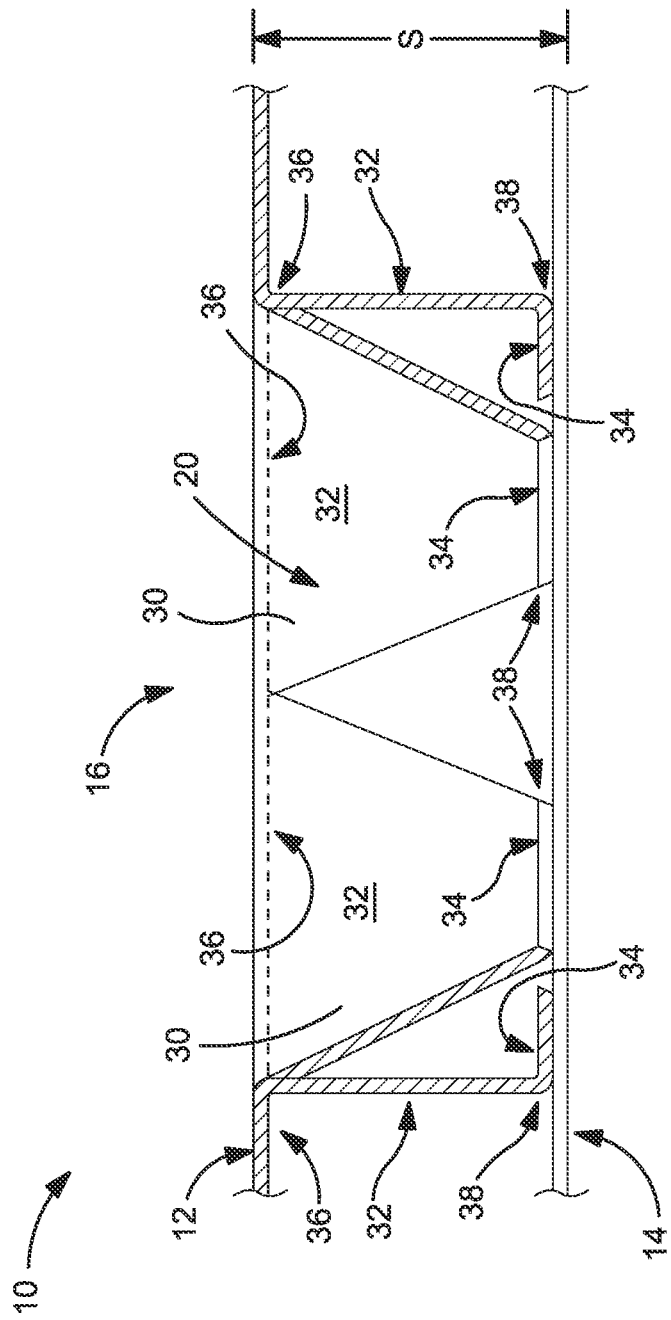
FIG. 3 is a side elevation, in section, of the region of the paperboard panel labeled "2" as shown in FIG. 1, the sectional view taken in the direction of arrows 3-3 of FIG. 2.

In the embodiment of FIG. 1-3 of the present invention, each of spacer structures 16 or 18 is a hexagonal opening 20, wherein the openings of spacer structures 18 are rotated 30 degrees, relative to adjacent rows of spacer structures 16. Each opening 20 of a first linerboard 12 results when rows of star-shaped die cuts 22, 24 are made in an imperforate sheet of linerboard, to define rows of spacer positions 26, 28, respectively, using a die structure such as described hereinafter with respect to FIG. 5.

Star-shaped die cuts 22, 24 define pluralities of triangular flaps 30 in first linerboard 12. Each triangular flap 30, in the finished product (FIG. 1-3) defines a trapezoidal panel 32 and a triangular tip 34, set off by folds (or other lines of weakness, such as perforations) 36, 38, respectively. In a preferred embodiment of the invention, any suitable adhesive material couples triangular tips 34 to second linerboard 14. Die cuts 22, 24 may be formed by any suitable method known to one having ordinary skill in the art, such as roller dies.

Figure 5:
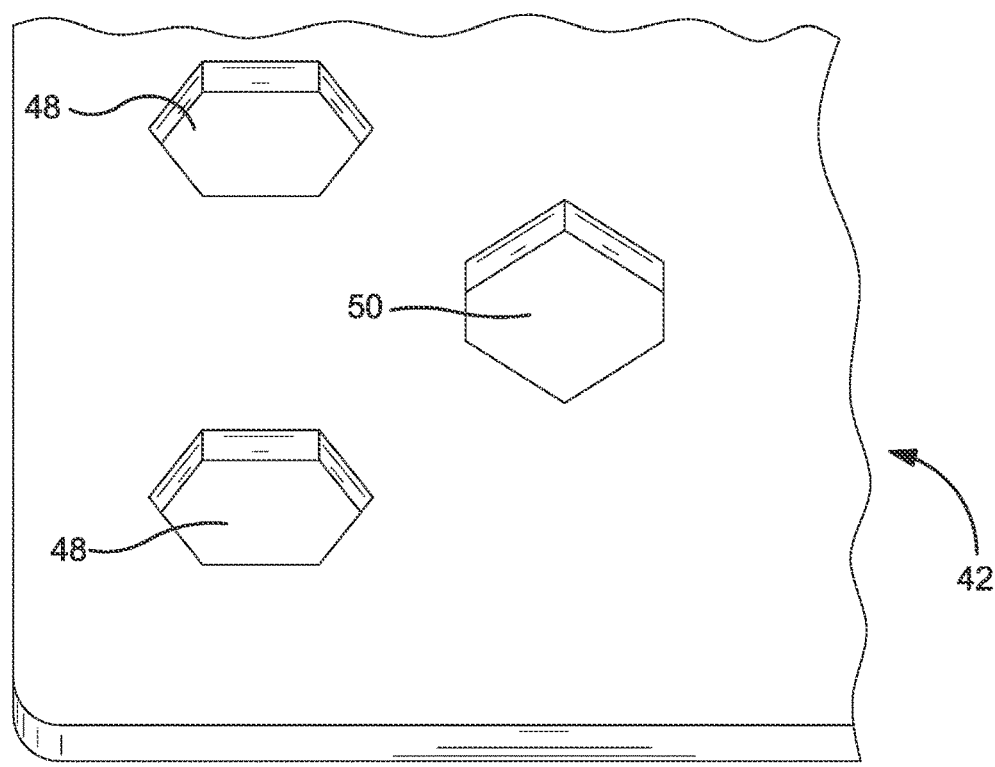
FIG. 5 is an exploded perspective view of an exemplary die configuration for forming the paperboard panel of FIG. 1-2.
Figure 5:
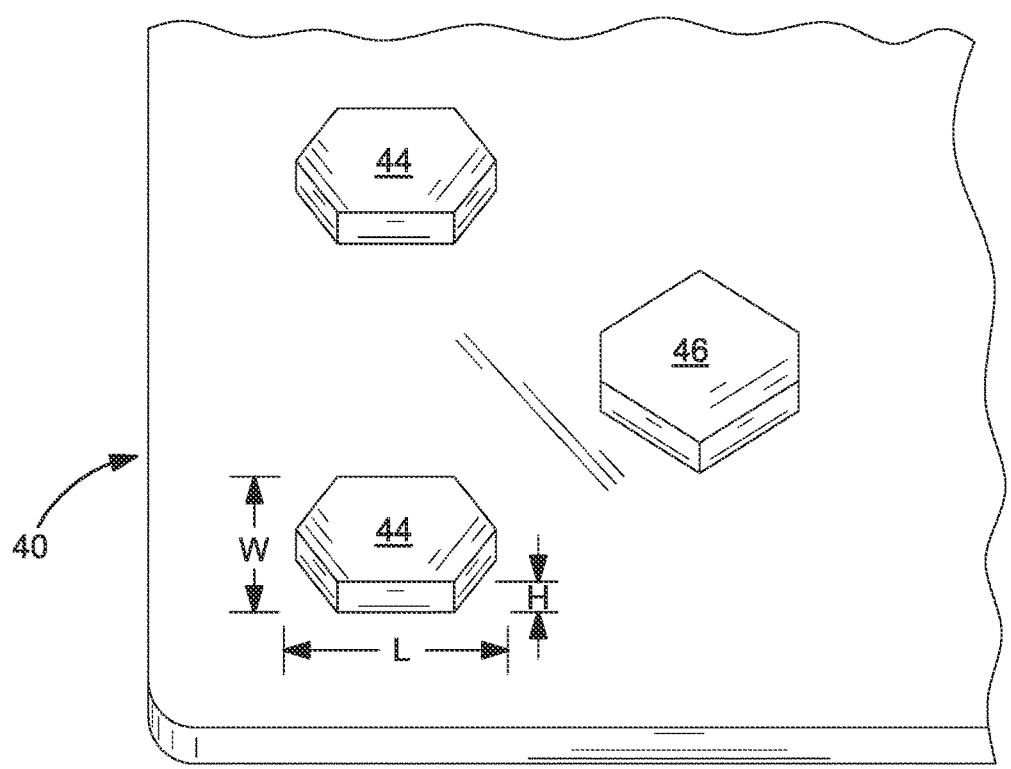

FIG. 5 illustrates a conceptual mechanism for forming paperboard panel 10, comprising a male forming die 40 and a female forming die 42. Male and female forming dies 40, 42, respectively, are illustrated as planar dies, but in alternative embodiments, other configurations, such as roller or segmented dies may be developed by those having ordinary skill in the art without departing from the scope of the invention. Male forming die 40 is provided with rows of projections 44, 46, which correspond in their shape and length (L) and width (W) to the respectively-oriented hexagonal openings 20 (FIG. 3), and which correspond in height (H) to the depth of opening 20, which, in turn, corresponds to a final intended nominal spacing (S; FIG. 3) between first linerboard 12 and second linerboard 14 in a finished paperboard panel 10. Female forming die 42 is provided with rows of recesses 48, 50, respectively, which may be through openings or, alternatively, blind bores. Recesses 48, 50, respectively, have a depth, shape, dimensions and orientation which correspond to projections 44, 46 of male forming die 40.

Figure 4:
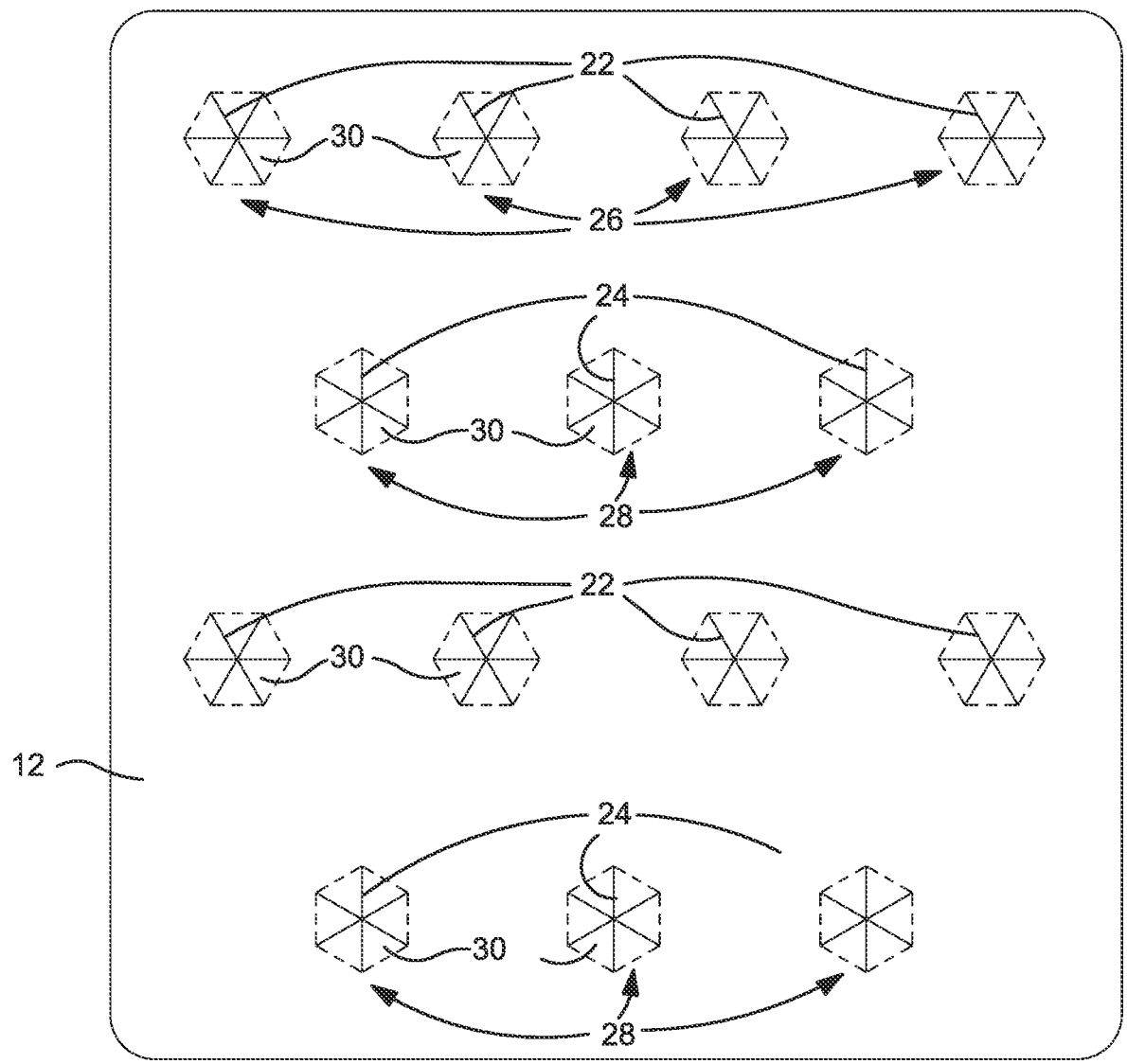
FIG. 4 is a first plan view of a first linerboard of a paperboard panel according to an embodiment of the invention, shown prior to attachment to a second linerboard sheet.

In an exemplary method of the invention, a die cut first linerboard 12 (FIG. 4) is positioned between a male forming die 40 and a female forming die 42. Female forming die 42, if provided with through-holes 48, 50, may be provided with a backing panel (not shown, but the function of which will be described hereinbelow). Spacer positions 26, 28 are aligned with projections 44, 46 and with recesses 48, 50. As forming dies 40, 42 are brought together, projections 44, 46 push flaps 30 out of plane with respect to first linerboard 12. As tips 34 encounter the second of the recesses 48, 50 (if blind bores) or the backing panel (if recesses 48, 50 are through-holes), and are subsequently bent a second time, so as to ultimately arrive at the angled "Z"-shape seen in side-elevational cross-section in FIG. 3. The angle that the middle portion of the Z-shape describes with respect to the boards 12 and 14 may be selected as desired, as dictated by the material properties of the boards, and/or as necessary to meet the requirements of any particular application, all as may be readily implemented by one having ordinary skill in the art, having this disclosure before them. In an alternative embodiment, not shown, tips 34 can be further turned in a radially-outward direction, relative to their respective openings 20, so as to be turned under and between boards 12 and 14. In this alternative embodiment, the sides of tips 34, which originally faced outwardly away from board 14, would be brought into juxtaposition with and adhered to, the inwardly-facing side of board 12.

To facilitate the subsequent assembly of a so-articulated first linerboard 12 to a second linerboard 14, projections 44, 46 may be provided with air passages (not shown), coupled to a source of negative pressure, the air passages terminating in openings in the outer surfaces of projections 44, 46. Such air passages preferably are positioned so as to allow male forming die 40 to "grip" the tips 34 of folded flaps 30. In this manner, male forming die 40 can be moved away from female forming die 42. A suitable adhesive material may be applied to one or both of exposed surfaces of tips 34 and/or a side of second linerboard 14. Male forming die 12, carrying die cut and folded first linerboard 12, is subsequently brought into juxtaposition with second linerboard 14, such that tips 34 of flaps 30 are brought into contact with second linerboard 14, and the adhesive(s) are allowed to dry/cure, so as to ultimately result in the paperboard panel configuration shown in FIG. 1-3.

In the embodiment shown and described herein, six-pointed star-shaped die cuts are employed, in which the die cuts of one row are offset from the die cuts of the adjacent rows, and the star-shaped cuts are rotated 30° (thirty degrees) from the star-shaped die cuts in the adjacent rows. The basis for selection of this configuration is because it is believed to provide an optimal combination of compressive strength as well as lateral shear force resistance. However, other configurations may be employed by one having ordinary skill in the art without departing from the scope of the invention.

Paperboard panels, such as paperboard panel 10 illustrated and described herein, are believed to possess performance characteristics, such as strength and durability, which are comparable to similarly-dimensioned corrugated paperboard panels. However, inasmuch as the internal layer of corrugated medium has been omitted, a materials cost savings on the order of one-third is realized.

While the embodiments of the invention disclosed herein are presently considered to be preferred, various changes and modifications can be made without departing from the spirit and scope of the invention. The scope of the invention is indicated in the appended claims, and all changes and modifications that come within the meaning and range of equivalents are intended to be embraced therein.

What is claimed is:

1. A method of fabricating a paperboard panel, comprising the steps of:
    fabricating a first linerboard;
    fabricating a second linerboard such that the paperboard panel consists of only the first and second linerboards;
    forming a spacer structure, the spacer structure comprising at least one flap member extending monolithically from one of the first and second linerboards, the step of forming the spacer structure comprising the steps of
        cutting at least one flap member into one of the first and second linerboards,
        folding the at least one flap member in a first direction, into an orientation defining an angle with respect to the one of the first and second linerboards,
        folding a tip portion of the at least one flap member in a second direction, to define a body portion of the at least one flap member, extending between the tip portion and the one of the first and second linerboards, the tip portion being folded into an orientation defining an angle with respect to the body portion;
    coupling a surface of the tip portion of the at least one flap member to an inwardly-facing surface of the other of the first and second linerboards, the step of cutting at least one flap member further comprising cutting at least two flap members, extending from and defining at least in part, corresponding portions of an edge of a single aperture in the one of the first and second linerboards, wherein each of the at least two flap members further comprises a substantially triangular member having a base region adjacent one of said edge portions and each of the at least two flap members further comprises a free point disposed at an end thereof opposite said base region, wherein the free points of the at least two flap members are physically separate and spaced apart from one another at locations of coupling to the other of the first and second linerboards.

2. The method according to claim 1, wherein the tip surface is an inwardly-facing surface.

3. The method according to claim 1, wherein the tip surface is an outwardly-facing surface.

4. The method according to claim 2, further comprising the step of affixing the tip to the inwardly-facing surface of the other of the first and second liner boards with adhesive.

5. The method according to claim 3, further comprising the step of affixing the to the inwardly-facing surface of the other of the first and second liner boards with adhesive.

6. A method of fabricating a paperboard panel, comprising the steps of:
fabricating a first linerboard;
fabricating a second linerboard, such that the paperboard panel consists of only the first and second linerboards;
forming a spacer structure, the spacer structure comprising at least one flap member extending monolithically from one of the first and second linerboards, the step of forming the spacer structure comprising the steps of:
cutting at least one flap member into one of the first and second linerboards,
folding the at least one flap member in a first direction, into an orientation defining an angle with respect to the one of the first and second linerboards,
folding a tip portion of the at least one flap member in a second direction, to define a body portion of the at least one flap member, extending between the tip portion and the one of the first and second linerboards, the tip portion being folded into an orientation defining an angle with respect to the body portion;
coupling a surface of the tip portion of the at least one flap member to an inwardly-facing surface of the other of the first and second linerboards,
wherein the step of cutting at least one flap member further comprises a step of:
cutting at least three flap members extending from and defining at least in part, corresponding portions of an edge of a single aperture in the one of the first and second linerboards;
at least two flat members of the at least three flap members extending from and defining at least in part, corresponding portions of an edge of a single aperture in one of the first and second linerboards, wherein the corresponding edge portions are disposed immediately adjacent one another and define an included angle therebetween, which angle is greater than zero degrees and less than one hundred eighty degrees;
at least two of the flap members of the at least three flap members extending from and defining at least in part, corresponding portions of an edge of a single aperture in the one of the first and second linerboards, wherein the at least two flap members are defined by a cut line disposed along a common edge region of the at least two flap members.

* * * * *